United States Patent
Hong et al.

(10) Patent No.: US 9,110,211 B2
(45) Date of Patent: Aug. 18, 2015

(54) LIGHT GUIDE PLATE FOR PLANE LIGHT SOURCE, METHOD FOR MANUFACTURING THE SAME, AND PLANE LIGHT SOURCE UNIT USING THE SAME

(75) Inventors: Beom Sun Hong, Seoul (KR); Jun Phill Eom, Seoul (KR); Dong Mug Seong, Seoul (KR); Dong Hyun Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 95 days.

(21) Appl. No.: 13/996,884

(22) PCT Filed: Aug. 1, 2011

(86) PCT No.: PCT/KR2011/005656
§ 371 (c)(1),
(2), (4) Date: Jun. 21, 2013

(87) PCT Pub. No.: WO2012/086894
PCT Pub. Date: Jun. 28, 2012

(65) Prior Publication Data
US 2013/0272028 A1    Oct. 17, 2013

(30) Foreign Application Priority Data
Dec. 23, 2010  (KR) .......................... 10-2010-0133433

(51) Int. Cl.
*F21V 7/04*  (2006.01)
*F21V 8/00*  (2006.01)
*G02F 1/1335*  (2006.01)

(52) U.S. Cl.
CPC ............ *G02B 6/0058* (2013.01); *G02B 6/0035* (2013.01); *G02B 6/0036* (2013.01); *G02B 6/0061* (2013.01); *G02F 1/133605* (2013.01); *G02F 2001/133607* (2013.01)

(58) Field of Classification Search
CPC .... G02B 6/0036; G02B 6/0038; G02B 6/0053
USPC .................................. 362/619, 620, 617, 618
See application file for complete search history.

(56) References Cited

U.S. PATENT DOCUMENTS 5,718,497 A * 2/1998 Yokoyama et al. ........... 362/625
6,011,602 A * 1/2000 Miyashita et al. .............. 349/65
(Continued)

FOREIGN PATENT DOCUMENTS

CN    101103372 A    1/2008
JP    07-333442 A    12/1995
(Continued)

OTHER PUBLICATIONS

International Search Report in International Application No. PCT/KR2011/005656, filed Aug. 1, 2011.
(Continued)

*Primary Examiner* — Evan Dzierzynski
(74) *Attorney, Agent, or Firm* — Saliwanchik, Lloyd & Eisenschenk (57) ABSTRACT

A light guide plate and a plane light source unit are provided. The light guide plate for a plane light source unit includes a plurality of unit pattern regions each having a plurality of optical patterns on surfaces thereof, wherein one or more unit pattern regions have different sag values (height:lens size) of the optical patterns constituting the unit pattern regions. Unit pattern regions are implemented with segmented optical patterns, which are equal in height, from the outside of the light guide plate to the central part thereof, by adjusting the density and size of microlenses, thereby improving the light uniformity and light efficiency and improving the efficiency of manufacturing processes.

19 Claims, 6 Drawing Sheets

(56) References Cited

U.S. PATENT DOCUMENTS

| | | | |
|---|---|---|---|
| 8,421,954 B1* | 4/2013 | Moon | 349/62 |
| 2006/0187677 A1* | 8/2006 | Parikka et al. | 362/619 |
| 2007/0189033 A1 | 8/2007 | Watanabe et al. | |
| 2009/0323372 A1* | 12/2009 | Kurihara et al. | 362/620 |
| 2010/0134720 A1* | 6/2010 | Choi et al. | 349/64 |
| 2010/0290249 A1* | 11/2010 | Mai et al. | 362/607 |

FOREIGN PATENT DOCUMENTS

| | | |
|---|---|---|
| JP | 2007-220347 A | 8/2007 |
| KR | 10-2008-0111646 A | 12/2008 |
| KR | 10-2009-0031055 A | 3/2009 |
| KR | 10-2010-0008475 A | 1/2010 |
| KR | 10-2010-0042211 A | 4/2010 |
| TW | 2009-46327 A | 11/2009 |
| TW | M370050 U | 12/2009 |

OTHER PUBLICATIONS

Office Action dated Dec. 9, 2013 in taiwanese Application No. 10-221695250, filed Aug. 3, 2011.

* cited by examiner

LIGHT GUIDE PLATE FOR PLANE LIGHT SOURCE, METHOD FOR MANUFACTURING THE SAME, AND PLANE LIGHT SOURCE UNIT USING THE SAME

CROSS-REFERENCE TO RELATED APPLICATIONS

This application is the U.S. national stage application of International Patent Application No. PCT/KR2011/005656, filed Aug. 1, 2011, which claims priority to Korean Application No. 10-2010-0133433, filed Dec. 23, 2010, the disclosures of each of which are incorporated herein by reference in their entirety.

TECHNICAL FIELD

The present invention relates to a light guide plate for a plane light source unit, which is capable of improving light efficiency.

BACKGROUND ART

A backlight unit, a representative implementation example of a plane light source unit, functions to emit light uniformly to the backside of a liquid crystal display (LCD), which is not self-luminous, so as to make a displayed image visible. A light guide plate is a component that controls the backlight unit to provide uniform brightness and light emission, and is one of plastic lenses that transfers light emitted from a light source (LED) uniformly to the entire surface of the LCD.

Figure 1:
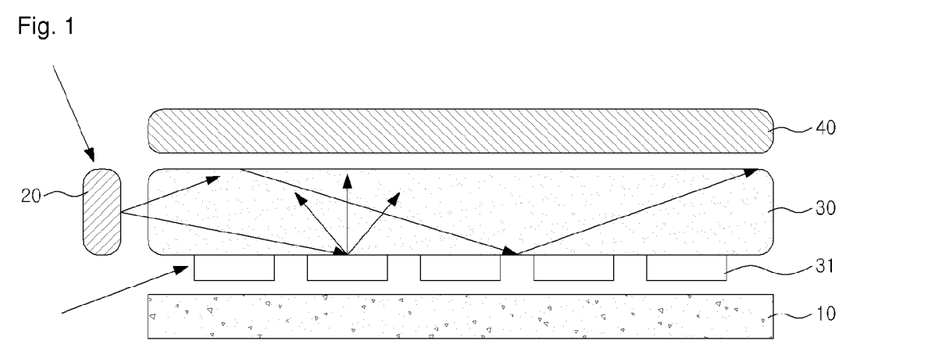
FIG. 1 shows a structure of a conventional edge type backlight unit (BLU)

FIG. 1 shows a structure of a conventional edge type backlight unit (BLU).

Light emitted from a light source 20 is propagated while being totally reflected through a light guide plate 30. A critical angle for total reflection is determined by refractive indexes of a medium and an air layer, based on Snell's law, and light within the critical angle is propagated while minimizing energy loss unless the light collides with a mechanical structure that makes light propagated beyond the critical angle. In the case of a printed light guide plate, scattering and transmission are caused using white dot patterns 31.

In the case of white dot patterns, light may not be used optimally due to loss of light and limit of fill factor. Therefore, in order to use the printed light guide plate as a light source, a diffuser plate 40 or a diffuser sheet should be stacked on the light guide plate 30, so that the printed white dot patterns are not seen. In addition, if a light guide plate is manufactured by an existing laser machining, a pattern processing time is long and there is a limitation in implementing fine patterns.

DISCLOSURE OF INVENTION

Technical Problem

An aspect of the present invention is directed to a light guide plate and a plane light source unit, in which unit pattern regions are implemented with segmented optical patterns, which are equal in height, from the outside of the light guide plate to the central part thereof, by adjusting the density and size of microlenses, thereby improving the light uniformity and light efficiency and improving the efficiency of manufacturing processes.

Solution to Problem

According to an embodiment of the present invention, there is provided a light guide plate for a plane light source unit. The light guide plate includes a plurality of unit pattern regions each having a plurality of optical patterns on surfaces except a light incidence surface, wherein one or more unit pattern regions have different sag values (height:lens size) of the optical patterns constituting the unit pattern regions.

According to another embodiment of the present invention, there is provided a plane light source unit using a light guide plate. The plane light source unit includes: an LED light source; a light guide plate for receiving light emitted from the LED light source and guiding the received light in a forward direction; and a plurality of unit pattern regions each having a plurality of optical patterns on surfaces except a light incidence surface, wherein one or more unit pattern regions have different sag values (height:lens size) of the optical patterns constituting the unit pattern regions.

The above-described modified embodiments according to the present invention can also be applied to the modified embodiments of the light guide plate. For example, by fixing the height of the optical patterns to an equal value and varying the size of the patterns, the unit patterns may be implemented in a different arrangement structure, and the optical patterns may be arranged such that the density between the unit pattern regions is different.

Advantageous Effects of Invention

According to the present invention, unit pattern regions are implemented with segmented optical patterns, which are equal in height, from the outside of the light guide plate to the central part thereof, by adjusting the density and size of microlenses, thereby improving the light uniformity and light efficiency and improving the efficiency of manufacturing processes.

Furthermore, the unit pattern regions are implemented simply by adjusting the arrangement density or width of the optical patterns having the same height. Therefore, the master mold may be easily manufactured, thereby simplifying the manufacturing process and reducing the manufacturing costs.

BRIEF DESCRIPTION OF DRAWINGS

The above and other aspects, features and advantages of certain exemplary embodiments of the present invention will be more apparent from the following description taken in conjunction with the accompanying drawings, in which.

REFERENCE NUMERALS

110: Reflective Film 120: Light Source
130: Light Guide Plate 140: Optical Patterns
X, Y: Light Incidence Surface
Z: Light Exit Surface (one surface of the light guide plate)
200: Master Mold 210: Mold Patterns
300: Resin Layer

MODE FOR THE INVENTION

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another.

The present invention relates to a light guide plate that is manufactured using a microlens array. More particularly, the present invention is directed to uniformly emit light energy, which is transferred to a light guide plate, with respect to a light emission area and maximize the efficiency of light energy by adjusting a size of a microlens and a fill factor, while a microlens is equal in height.

Figure 2:
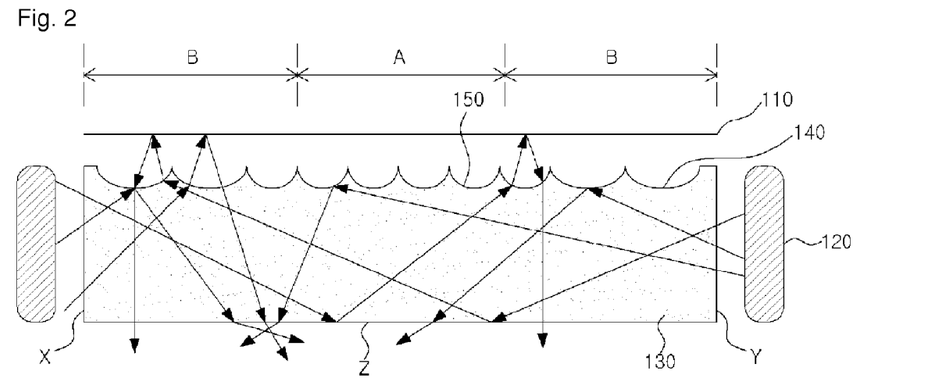
FIG. 2 is a conceptual diagram showing a structure of a light guide plate and a plane light source unit including the same according to the present invention.

FIG. 2 is a conceptual diagram showing a structure of a light guide plate and a plane light source unit including the same according to the present invention.

Referring to FIG. 2, the light guide plate 130 according to the present invention includes unit pattern regions A and B having optical patterns 140 and 150 formed on the surfaces thereof. Specifically, the light guide plate 130 includes one or more unit pattern regions in which optical patterns constituting the unit pattern regions have different sag values (height: lens size). That is, it is preferable to arrange the optical patterns at a constant density. In this case, it is preferable to provide at least one region (hereinafter, defined as a "unit pattern region") that adjusts a sag value differently by varying the size of the optical patterns, while the optical patterns are equal in height. In particular, it is more preferable that the optical patterns are formed on the surface of the light guide plate 130, except light incidence surfaces X and Y.

Specifically, the optical patterns constituting the respective unit pattern regions may be arranged to have different sag values. In particular, it is preferable that the optical patterns constituting the unit pattern regions are implemented with microlens array patterns having the equal height. That is, by fixing the height of the optical patterns and varying the size of the optical patterns in each unit pattern region, light energy transferred to the light guide plate 130 is emitted uniformly with respect to a light emission area and efficiency of light energy is maximized.

In FIG. 2, various light sources, such as CCFL and EEFL, may be used as a light source 120 that emits light at the outside of the light guide plate 130. In a preferred embodiment of the present invention, the case where a light emitting diode (LED) is applied as the light source 120 will be taken as an example. In this case, one or more LED light sources 120 for light emission are arranged on a printed circuit board. In a preferred embodiment of the present invention, side view LEDs may be used. That is, light from the LED light sources 120 is not directly emitted upward, but is emitted toward sides of the light guide plate 130. In addition, the side view LEDs may be arranged in a direct type or an edge type. Although the edge type arrangement is illustrated in FIG. 2, the light guide plate according to the present invention can also be applied to the direct type arrangement.

The light guide plate 130 has a plate type structure that has a light exit surface Z, and the other surface opposite to the light exit surface Z. The light guide plate 130 may be formed of transparent acryl (PMMA: poly methyl metacrylate) or transparent polycarbonate (PC), or may be formed of a material with superior light transmission, which is flexible enough to ensure flexibility. In particular, the plurality of optical patterns 140 and 150 may be provided on the other surface of the light guide plate 130 opposite to the surface Z thereof, and it is preferable that the optical patterns are formed in an engraved structure.

In the structure of FIG. 2, the second unit pattern regions B with the second optical patterns 140 having the same height as the first optical patterns 150 and different sizes from the first optical patterns 150 may be arranged adjacent to the first unit pattern region A with the first optical patterns 150 having the same height and the same size. In particular, in this case, it is preferable that the plurality of unit pattern regions on the other surface of the light guide plate 130 are arranged such that sag values of the optical patterns are gradually increased toward the center of the light guide plate 130. In this embodiment, the first unit pattern region A may be arranged such that it has a greater sag value than that of the optical pattern constituting the second unit pattern region B.

Through such an arrangement, the microlens array patterns, which are optical patterns, are engraved on the other surface (bottom) of the light guide plate 130. The microlens array patterns are formed from both sides of the LED light source 120 to the central part by adjusting the size and density of the lenses, while the height of the lenses is equal. Thus, it is possible to improve the entire light uniformity and light efficiency of the light guide plate 130. In particular, the optical patterns may be arranged such that the optical patterns between the respective unit pattern regions are different in density. The optical patterns constituting the same unit pattern region may have the same lens size, and the optical patterns may be arranged at regular intervals or irregular intervals.

In addition, the microlens array patterns, which are optical patterns, may have a circular shape, an oval shape, a prism shape, a lenticular shape, or an R-prism shape. The lens size may range from 10 μm to 100 μm.

Figure 3:
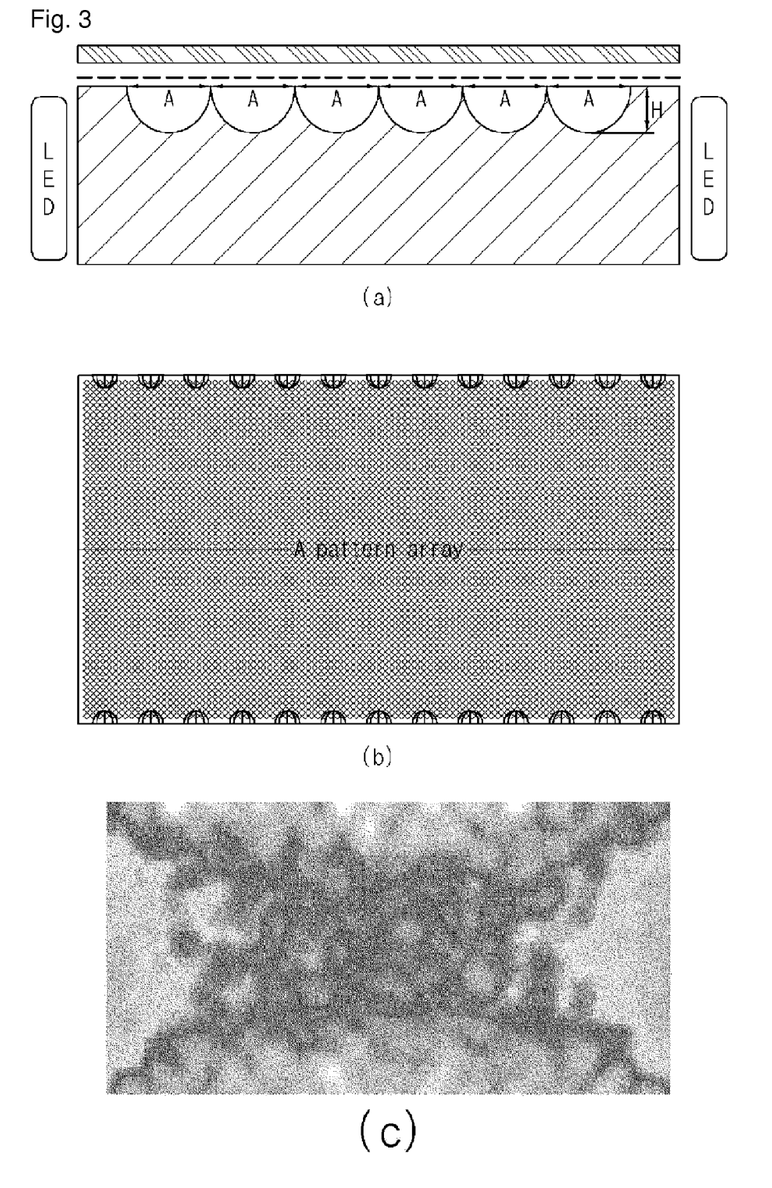
FIGS. 3 to 5 show simulation results of light uniformity that is increased in the light guide plate by adjusting the number of unit pattern regions and the size (height being fixed) and density of a microlens array being optical patterns through an embodiment in which the unit pattern regions according to the present invention are implemented.
Figure 4:
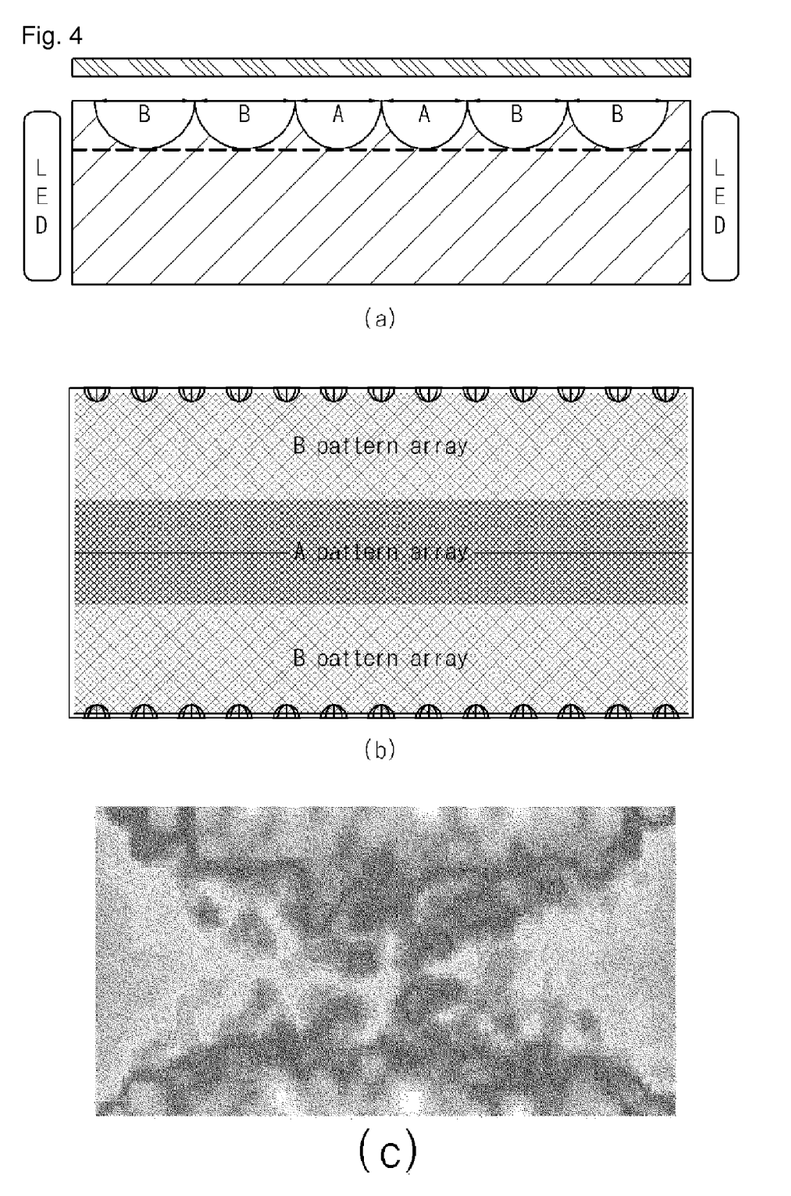
Figure 5:
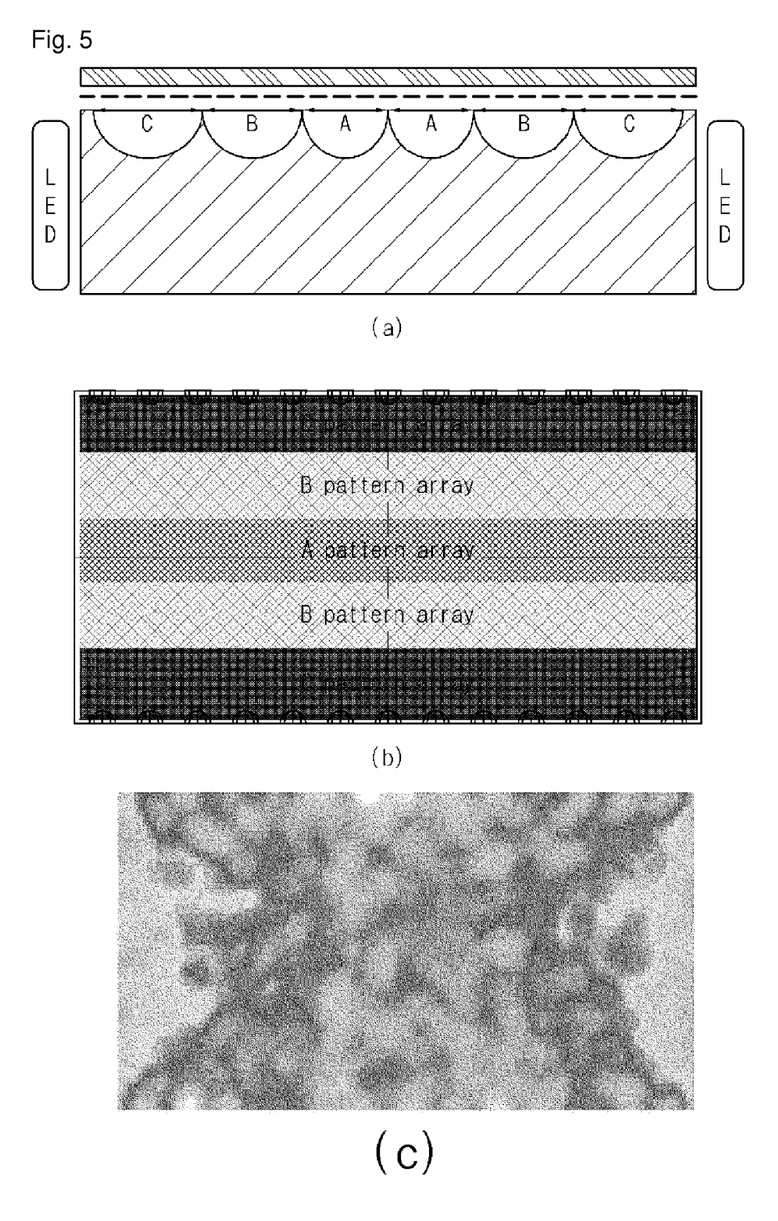

FIGS. 3 to 5 show simulation results of light uniformity that is increased in the light guide plate by adjusting the number of unit pattern regions and the size (height being fixed) and density of a microlens array being optical patterns through an embodiment in which the unit pattern regions according to the present invention are implemented.

FIG. 3 shows an implementation result of the unit pattern region in which a lens height is fixed and a lens size is equal.

In the case where a microlens pattern array with a fixed lens height H and an equal lens width A is implemented as shown in FIG. 3(a), the pattern array is uniformly arranged as shown in FIG. 3(b) and exhibits the uniformity of FIG. 3(c).

In FIG. 4(a), a first unit pattern region including lens patterns with an equal lens width A is formed at the central part of the light guide plate, and a second unit pattern region including lens patterns with a lens width B is formed adjacent to the first unit pattern region. That is, when the pattern array is implemented as shown in FIG. 4(b), the result of the improved light uniformity can be seen from FIG. 4(c).

In addition, FIG. 5 shows an example in which five unit pattern regions are provided and adjacent unit pattern regions (lens width B> lens width C) are provided such that a lens sag value is decreased from the unit pattern region (lens width A) of the central part. It can be seen from FIG. 5(c) that the light uniformity is further increased.

That is, although FIGS. 3 to 5 show the example in which an odd number (2n−1) of unit pattern regions (where n is a natural number) are provided and the unit pattern regions are arranged such that the sag value is gradually decreased from the unit pattern region of the central part, it is apparent that an even number (2n) of unit pattern regions can also be arranged. Consequently, it can be seen that, as more unit pattern regions are provided, the light efficiency and light uniformity are further improved. The density of lenses may be adjusted according to the interval between lenses, and lenses may be arranged randomly or in a hexagonal, lenticular or radial structure.

Figure 6:
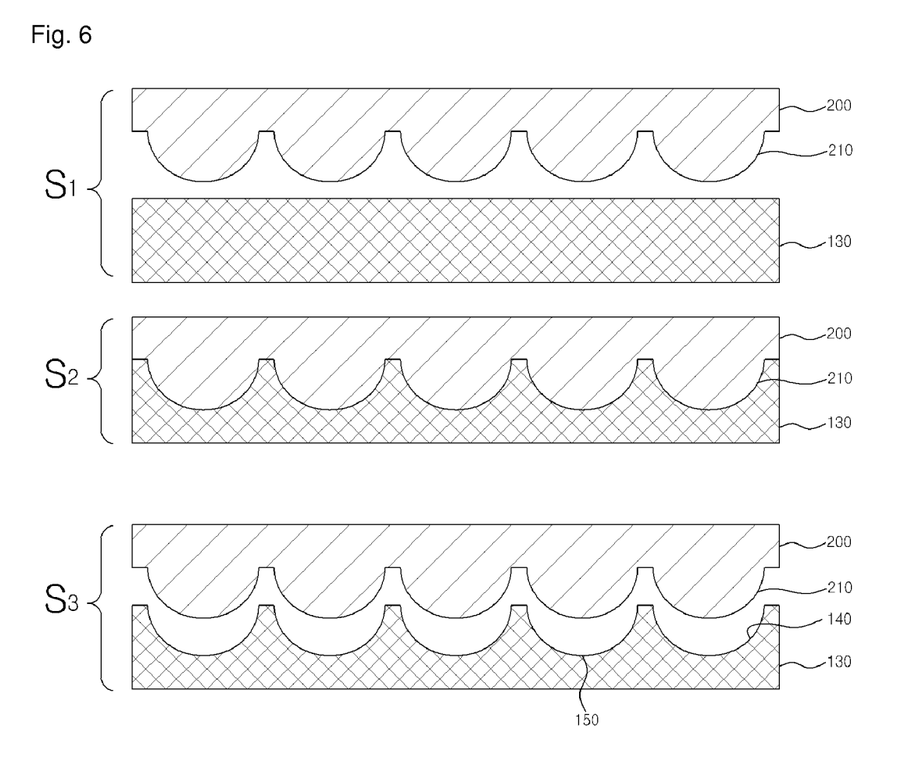
FIGS. 6 and 7 show a process of implementing optical patterns on a light guide plate according to the present invention.
Figure 7:
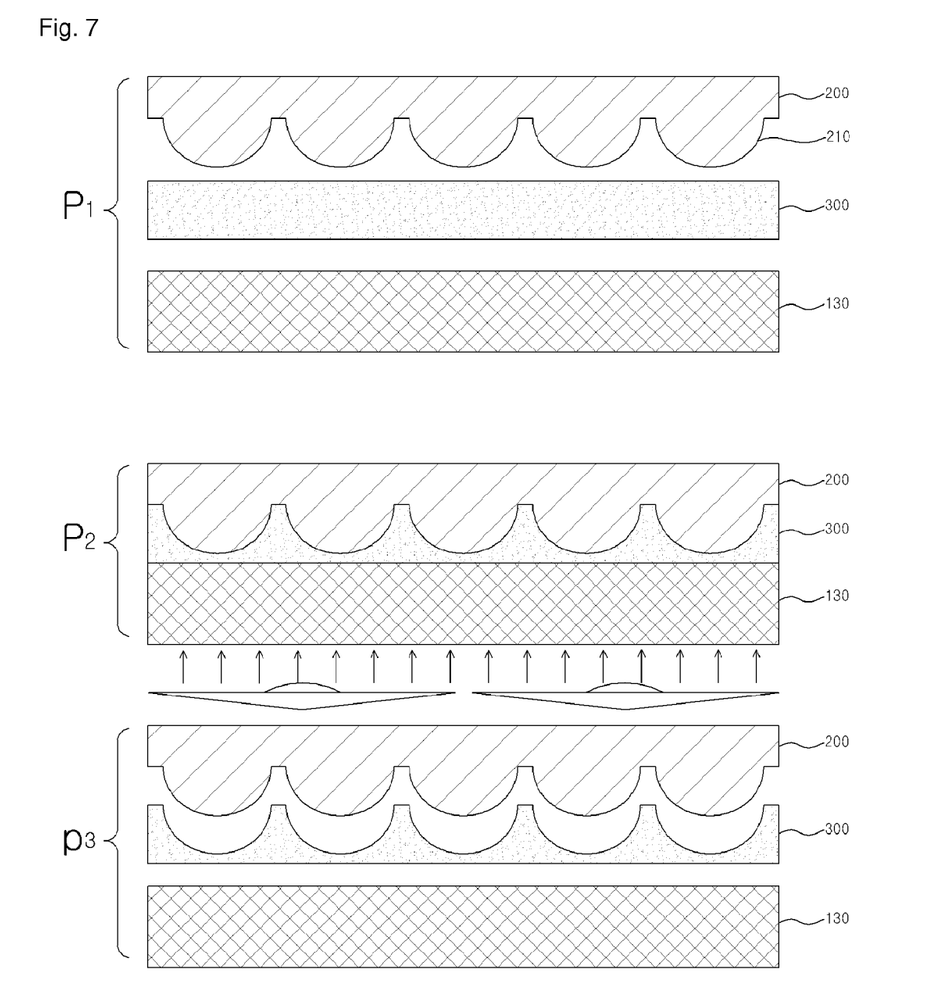

FIGS. 6 to 7 show a process of implementing optical patterns on a light guide plate according to the present invention.

Referring to the process diagram of FIG. 6, mold patterns 210 are formed in a metallic master mold 200, and it is preferable that the mold patterns 210 have a reverse structure of the optical patterns formed in the above-described light guide plate. In addition, it is preferable that the unit pattern region having the above-described structure is implemented by fixing the height of the mold patterns 210 to the equal value and varying the size of the mold patterns 210.

Thereafter, the light guide plate with engraved optical patterns according to the present invention can be implemented by hot pressing or imprinting the mold patterns 210 of the master mold 200 on a light guide plate material 130 (S1 to S3).

The process diagram shown in FIG. 7 is a modification of the embodiment of FIG. 6. Instead of directly implementing optical patterns on the surface of the light guide plate, the light guide plate may be manufactured by forming an ultraviolet (UV) or thermosetting resin layer 300 on the surface of the light guide plate and then performing an imprinting on the resin layer using the master mold (P1 to P3).

Alternatively, the optical patterns may be implemented through a process of casting a PMMA solution on the surface of the light guide plate by the medium of the master mold.

The light guide plate according to the present invention can adjust the size of the microlens in the range of 10 μm to 100 μm, and is advantageous in terms of fine patterns as compared to the conventional white dot pattern printing and laser processing.

As compared to the conventional light guide plate in which the height of the microlens is gradually increased from both sides of the LED to the central part, the height of the patterns is fixed and only the size thereof is varied. Thus, the master mold can be easily manufactured. In addition, due to such an optical pattern arrangement, a light source unit can be implemented without any conventional diffuser plate or diffuser sheet.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A light guide plate for a plane light source unit, comprising:
    a first plurality of unit pattern regions each having a plurality of optical patterns disposed on a first surface of the light guide plate;
    wherein a sag value of a unit pattern region of the first plurality of unit pattern regions disposed more proximate to a center of the light guide plate is greater than a sag value of a unit pattern region of the first plurality of unit pattern regions disposed less proximate to the center of the light guide plate, wherein the sag value is a ratio between a height and a lens size of an optical pattern.

2. The light guide plate of claim 1, wherein the optical patterns comprise microlens array patterns that are equal in height.

3. The light guide plate of claim 2, wherein a second plurality of unit pattern regions disposed on a second surface of the light guide plate are arranged such that sag values of optical patterns of the second plurality of unit pattern regions are gradually increased toward the center of the light guide plate.

4. The light guide plate of claim 2, wherein the unit pattern regions include optical patterns arranged such that the optical patterns between the respective unit pattern regions are different in density.

5. The light guide plate of claim 2, wherein the optical patterns of the same unit pattern region are equal in lens size.

6. The light guide plate of claim 5, wherein the optical patterns of the respective unit pattern regions are different in density.

7. The light guide plate of claim 2, wherein the optical patterns are engraved microlens array patterns.

8. The light guide plate of claim 7, wherein the microlens array pattern has a circular shape, an oval shape, a prism shape, a lenticular shape, or an R-prism shape.

9. The light guide plate of claim 8, wherein the optical patterns of the same unit pattern region are arranged regularly.

10. The light guide plate of claim 8, wherein the lens size of the optical patterns ranges from 10 μm to 100 μm.

11. The light guide plate of claim 8, wherein 2n−1 number of the first unit pattern regions (where n is a natural number) are formed, and the first unit pattern regions are arranged such that pattern density of the adjacent unit pattern regions is gradually increased from the nth unit pattern region.

12. The light guide plate of claim 8, wherein the optical patterns of the same unit pattern region are arranged irregularly.

13. The light guide plate of claim 1, wherein the optical patterns are directly formed on the first surface of the light guide plate.

14. The light guide plate of claim 1, wherein the optical patterns have a structure in which engraved patterns are formed in a resin layer stacked on the first surface of the light guide plate.

15. The light guide plate of claim 14, wherein the resin layer is an ultraviolet (UV) curing type or thermosetting type synthetic resin.

16. The light guide plate of claim 14, wherein the light guide plate is formed of transparent acryl (PMMA: poly methyl metacrylate) or transparent polycarbonate (PC).

17. A plane light source unit comprising:
    an LED light source;
    a light guide plate for receiving light emitted from the LED light source and guiding the received light in a forward direction; and
    a plurality of unit pattern regions each having a plurality of optical patterns disposed on a surface of the light guide plate;
    wherein a sag value of a unit pattern region of the plurality of unit pattern regions disposed more proximate to a center of the light guide plate is greater than a sag value of a unit pattern region of the plurality of unit pattern regions disposed less proximate to the center of the light guide plate, wherein the sag value is a ratio between a height and a lens size of an optical pattern.

18. The plane light source unit of claim 17, wherein the optical patterns are equal in height.

19. The plane light source unit of claim 18, wherein the unit pattern regions are arranged such that the unit pattern regions have different densities.

* * * * *